(12) United States Patent
Rossignol et al.

(10) Patent No.: US 6,560,625 B1
(45) Date of Patent: May 6, 2003

(54) FAST DIGITAL ADDER

(75) Inventors: Stéphane Rossignol, Grenoble (FR); Pierrette Faucherand, Saint Georges de Commiers (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/252,181

(22) Filed: Feb. 18, 1999

(30) Foreign Application Priority Data

Feb. 27, 1998 (FR) .............................. 98 02645

(51) Int. Cl.[7] ................................................ G06F 7/50
(52) U.S. Cl. ...................................................... 708/710
(58) Field of Search .............................. 708/710–713

(56) References Cited

U.S. PATENT DOCUMENTS

| | | | | |
|---|---|---|---|---|
| 5,396,435 A | | 3/1995 | Ginetti ...................... | 364/489 |
| 5,432,728 A | * | 7/1995 | Curtet ......................... | 708/710 |
| 5,633,820 A | * | 5/1997 | Beakes et al. .............. | 708/710 |
| 6,134,576 A | * | 10/2000 | Hossain et al. ............. | 708/710 |

FOREIGN PATENT DOCUMENTS

| EP | A-0-486 248 | 5/1992 | ........... G06F/15/60 |
|---|---|---|---|
| EP | A-0-707 262 | 4/1996 | ............. G06F/7/50 |

OTHER PUBLICATIONS

French Search Report from French Patent Application 98 02645, filed Feb 27, 1998.

Hwang, I.S., et al.: "A High–Speed Dynamically Reconfigurable 32–Bit CMOS Adder" Proceedings Of The Custom Integrated Circuits Conference, New York, May 16–19, 1988, No. Conf. 10, pp 1751–1756; Institute of Electrical and Electrical Engineers.

* cited by examiner

*Primary Examiner*—David H. Malzahn
(74) *Attorney, Agent, or Firm*—Wolf, Greenfield & Sacks, P.C.; James H. Morris

(57) ABSTRACT

A carry look-ahead digital adder that adds a first operand A of n bits and a second operand B of n bits, with $n=2^m$, including: a first block calculating couples of signals Pq and Gq from the bits of rank q, Aq and Bq, of the first and second operand, with $Pq=Aq+Bq$ and $Gq=Aq \cdot Bq$; and a second block formed of a regular array of elementary cells of identical functions arranged in n rows and m columns, and elementary cells having two couples of inputs {E1, E2} and {E3, E4} and one couple of outputs {O1,O2}, providing $O1=E1 \cdot E3$ and $O2=E2 \cdot E4+E3$; the elementary cells being interconnected to optimize the propagation speed of the internal signals along a tree-like path.

12 Claims, 3 Drawing Sheets

FAST DIGITAL ADDER

BACKGROUND OF THE INVENTION

1. Field of the Invention

The present invention relates to the field of digital adders, and more specifically to digital adders using a carry look-ahead technique.

2. Discussion of the Related Art

FIG. 1 schematically and partially shows a conventional carry look-ahead 8-bit adder that calculates A+B=S where, A, B, and S are coded over eight bits. A first block 1 of the adder includes eight identical cells 11, each having two inputs and one pair of outputs. A cell 11 of rank i is connected to receive on its first input bit $A_i$ and on its second input bit $B_i$. It generates a first signal $P_i$ such that $P_i=A_i+B_i$ and an output signal $G_i$ such that $G_i=A_i \cdot B_i$. A second block of the adder receives the 8 couples of signals $\{P_1, G_1\}$ to $\{P_8, G_8\}$ coming from block 1. Block 2 is formed of identical elementary cells 21 connected to calculate from the eight signal couples $\{P_1, G_1\}$ to $\{P_8, G_8\}$, eight couples of output signals $\{p_1, g_15\}$ to $\{p_8, g_8\}$. If k is included between 2 and 8, $p_k$ is such that $$p_k = \pi_{i=1} P_i, \text{ with } p_1 = P_1$$

and $g_k$ is such that $$g_k = \sum_{i=1}^{k-1} \left( G_i \pi_{j=i+1}^{k} P_j \right) + G_k, \text{ with } g_1 = G_1$$

The 8 couples $\{p_1, g_1\}$ to $\{p_8, g_8\}$ generated by block 2 allow calculation of sum S such that A+B=S. If $C_0$ is the entering carry of operation A+B, each term $S_i$ of sum S is given by $S_k=(C_0 \cdot P_{k-1}+g_{k-1}) \oplus A_k \oplus B_k$, with $S_1=C_0 \oplus A_k \oplus B_k$. Similarly, if $C_n$ is the exiting carry of operation A+B, $C_n$ is given by $C_n=C_0 \cdot p_n+g_n$. The calculation of terms $S_k$ and $C_n$ is performed by a block 3 of the adder, the structure of which is well known in the art.

An elementary cell 21 includes two input couples {E1, E2} and {E3, E4} and an output couple {O1, O2}. Output O1 is such that O1=E1. E3 and output O2 is such that O2=E2. E4+E3. It should be noted that no cell 21 is required to calculate couple $\{p_1, g_1\}$ since $\{p_1, g_1\}=\{P_1, G_1\}$. Conversely, a cell 21 is required to calculate $\{p_2, g_2\}$ from $\{P_1, G_1\}$ and $\{P_2, G_2\}$. Similarly, an additional cell 21 is required to calculate $\{p_3, g_3\}$ from $\{p_2, g_2\}$ and $\{P_3, G_3\}$.

The adder considered is an 8-bit adder. $8=2^3$, and it can be considered that block 2 is organized in a array of eight rows and three columns, a location of the array being occupied by a cell 21 or left empty. It should be noted that cells 21 of the third column of block 2 receive on their first input couple {E1, E2} the output couple {O1, O2} generated by the last cell 21 of the first half of the second column of block 2.

Similarly, considering a 16-bit adder, block 2 of the 16-bit adder include comprise four columns and sixteen rows, and the eight cells of the fourth column of block 2 would receive on their first input couple {E1, E2} the output couple {O1, O2} of the last cell 21 of the first half of the third column.

A major disadvantage of this architecture is that it includes a critical path in which a successive cell 21 controls twice as many cells as the preceding cell. More specifically, a cell 11 controls a single cell of the first column. Some cells of the first column each control two cells of the second column. Some cells of the second column each control four cells of the third column, etc. In order not to increase the propagation time between a first cell which controls n cells and one of these n cells, the fan-out of the first cell must be n, that is, the output transistors of the first cell must have a size n times higher than the minimum size. However, the size increase of the output transistors of a cell increases the propagation time of a cell, since the gate capacitances of these transistors are higher and take longer to be charged. Thus, it will not be possible to make the propagation time of a critical path as small as that of a non-critical path, lest the size of all the transistors on the critical path is adapted, which is practically impossible to implement.

Further, the circuit will include cells 21 of identical function but of different sizes. These cells 21 of different sizes will have to be created in a special library of a design system, which increases the number of cells to be managed by the designer.

Similarly, at the design of an adder, the physical implantation of the various cells 21 will have to be performed with great care to best optimize the critical path propagation time.

SUMMARY OF THE INVENTION

An object of the present invention is to provide an architecture that implements a carry look-ahead adder having a particularly fast operation.

Another object of the present invention is to provide such an adder which does not occupy a greater surface area than a conventional carry look-ahead adder.

Another object of the present invention is to provide such an adder architecture which simplifies the management of a design system library.

These objects as well as others are achieved by a digital adder that adds a first n-bit operand A and a second n-bit operand B, with $n=2^m$, comprising:

a first block calculating couples of signals Pq and Gq based on the bits of rank q, Aq and Bq, of the first and second operand, with Pq=Aq+Bq and Gq=Aq•Bq;

a second block formed of an array of elementary cells of identical functions arranged in n rows and m columns, an elementary cell having two inputs couples {E1, E2]} and {E3, E4} and one output couples {O1, O2}, providing O1=E1•E3 and O2=E2•E4+E3;

a normal elementary cell, that is, of a column i and of a row j, j being included between $k2^i-2^{i-1}+1$ and $k2^i$, with k varying between 1 and $2^{m-i}$, receiving:

on its first input couple, couple $\{P_{j-1}, G_{j-1}\}$ if i=1 and the output couple coming from the elementary cell of column i-1 and of row $(k-1)2^i+1$ otherwise, on its second input couple, couple $\{P_j, G_j\}$ if $j=k2^i-2^{i-1}+1$ or i=1, or the output couple coming from the elementary cell of row j and of the column r+1, r being defined so that $2^r+1 \leq j-(k-1)2^i-2^{i-1} \leq 2^{r+1}$ otherwise; and an auxiliary elementary cell, that is, of a column i and of a row j, j being included between $(k-1)2^i+1$ and $k2^i-2^{i-30\ 1}$, having its inputs and outputs connected in parallel with those of the elementary cells corresponding to a same value of k and of i, receiving:

on its first input couple, couple $\{P_j, G_j\}$ if i=1 and the output couple coming from the elementary cell of column i-1 and of row $(k-1)2^i+1$ otherwise, and on its second input couple, couple $\{P_{j+1}, G_{j+1}\}$ if i=1 and the output couple coming from the elementary cell of column i-1 and of row $k2^i-2^{i-1}+1$.

According to an embodiment of the present invention, the normal cells have a lower size than the auxiliary cells.

According to another embodiment of the present invention, the digital adder comprises means for, at least in the column of highest rank, selecting as an output the output couples of the normal cells or the second input couples of these cells.

The foregoing objects, features and advantages of the present invention will be discussed in detail in the following non-limiting description of specific embodiments in connection with the accompanying drawings.

DETAILED DESCRIPTION

Figure 1:
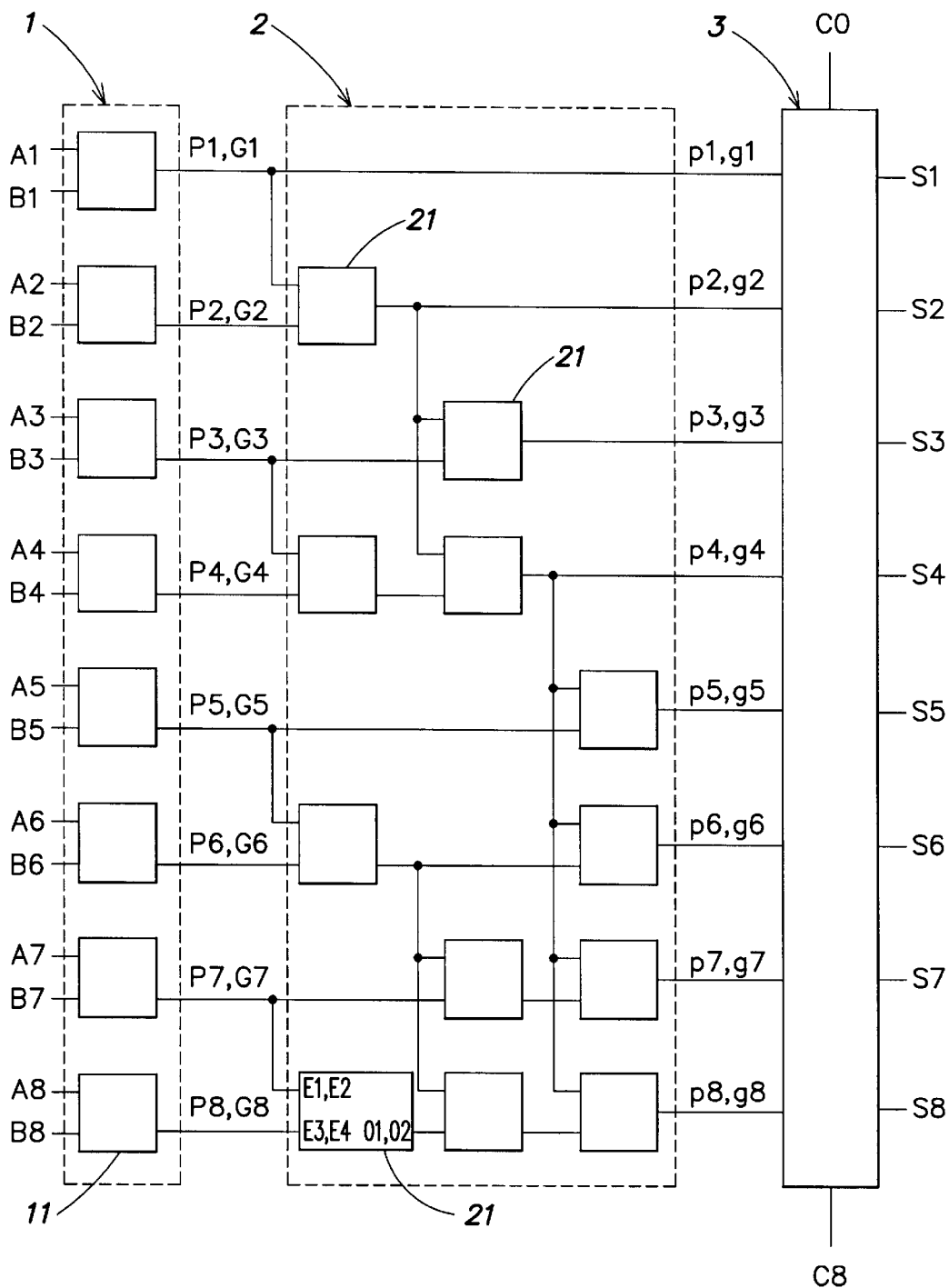
FIG. 1 schematically shows the architecture of a conventional carry look-ahead adder.
Figure 2:
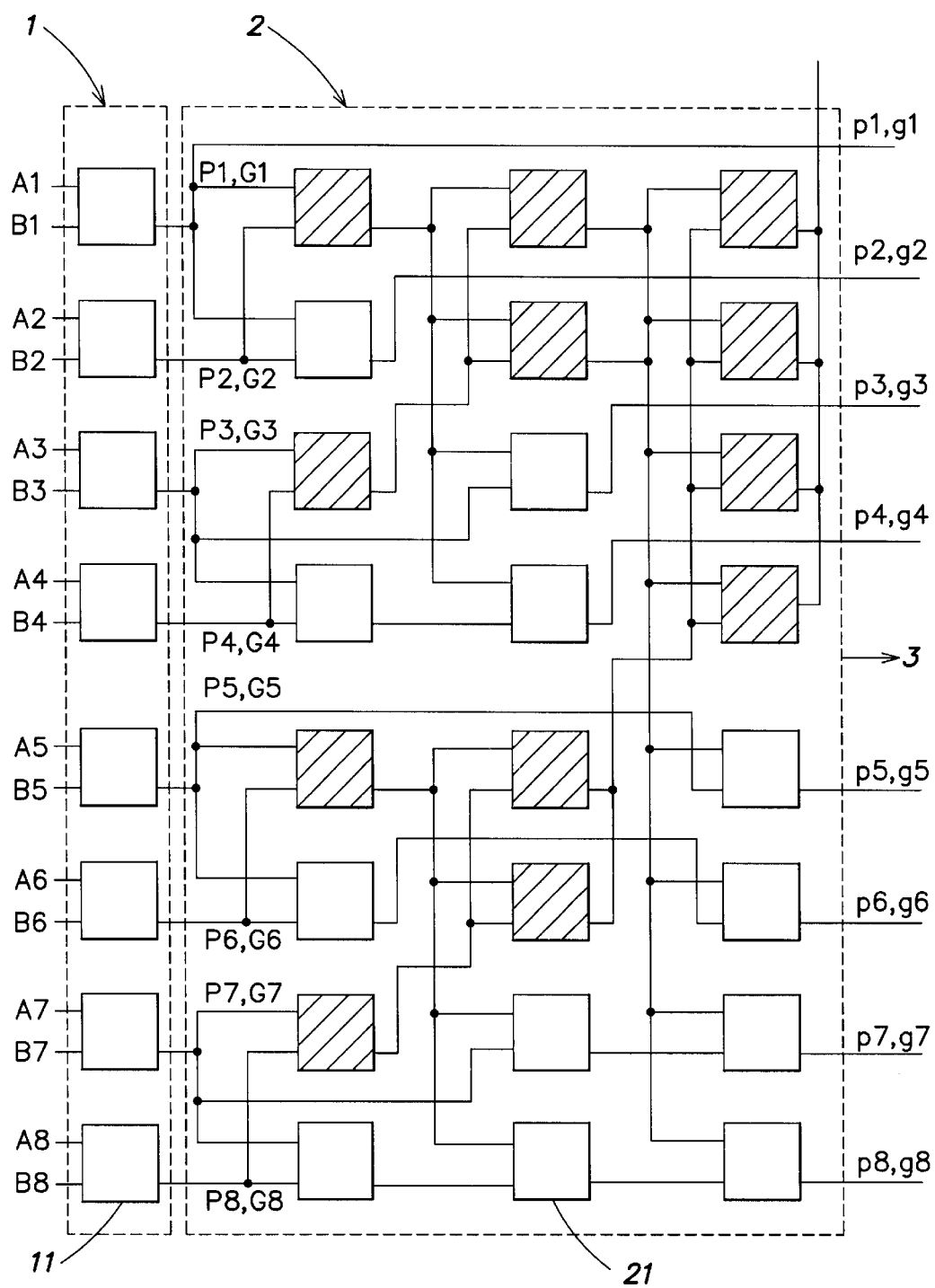
FIG. 2 schematically shows the architecture of a carry look-ahead adder according to the present invention.

In FIG. 2, an 8-bit carry look-ahead adder according to the present invention comprises a block 1 formed of a cells 11 generating eight couples of signals $\{P_i, G_i\}$ from bits $A_i$ and $B_i$ of operands A and B. The structure of block 1 is the same as that of the conventional block 1 of FIG. 1. A block 2 receives the 8 couples of signals $\{P_1, G_1\}$ to $\{P_8, G_8\}$ coming from block 1 and generates 8 couples of outputs $\{p_1, g_1\}$ to $\{p_8, g_8\}$ such as those described in relation with FIG. 1. Block 2 is organized in an array of identical cells 21, of same function as in FIG. 1. The array comprises eight rows and three columns for an 8-bit adder, with $8=2^3$. For an n-bit adder with $n=2^m$, block 2 of the adder is organized in an array of cells 21 of n rows and m columns.

Two types of cells 21 will be distinguished by their connections in block 2: the normal cells and the auxiliary cells. Normal cells are white and auxiliary cells are hatched in FIG. 2.

A normal cell is a cell 21 existing in a conventional adder, that is of column i and of row j, j ranging between $k2^i-2^{i-1}+1$ and $k2^i$, with k varying between 1 and $2^{m-i}$. In other words, the normal cells are those which are found at the even ranks of the first column, at the couples of even ranks of the second column, at quadruplets of the even ranks of the third column, ... at the $2^{i-1}$-uplets of even ranks of the i-th column. In the present case, k designates the number of column of the $2^{i-1}$-uplet of normal cells containing the cell of rank j.

If a normal cell belongs to the first column, it receives on its first input couple $\{E1, E2\}$ a couple $\{P_{j-1}, G_{j-1}\}$ coming from block 1 and on its second input couple $\{E3, E4\}$ a couple $\{P_j, G_j\}$ coming from block 1.

If a normal cell does not belong to the first column, it receives on its first input couple $\{E1, E2\}$ the output couple $\{O1, O2\}$ coming from the cell 21 of column i-1 and of row $(k-1)2^i+1$.

If j is such that $j=k2^i-2^{i-1}+1$, that is, if the normal cell is the first one of a $2^{i-1}$-uplet of even rank of the i-th column, the normal cell receives on its second input couple $\{E3, E4\}$ the couple $\{P_j, G_j\}$ coming from block 1.

Otherwise, the normal cell receives on its second input couple $\{E3, E4\}$ the output couple $\{O1,O2\}$ coming from the cell 21 of row j and of column r+1, where r is calculated from j, such that $2^r+1 \leq j-(k-1)2^i-2^{i-1} \leq 2^{r+1}$. For example, in FIG. 2, the cell of column 2 and of row 8 is such that i=2 and k=2. It receives on $\{E3, E4\}$ the couple $\{O1, O2\}$ from the cell of column 1 and of row 8, with $j-(k-1)2^i-2^{i-1}=2$, and r=0.

It should be noted that the normal elementary cells are all conventionally connected, except for the first input couples $\{E1, E2\}$ of the normal cells which do not belong to the first column. It should also be noted that, according to the present invention, the output couple $\{O1, O2\}$ of a normal cell controls at most, a single cell 21.

An auxiliary cell is a cell 21 of column i and of rank j, j ranging between $(k-1)2^i+1$ and $k2^i-2^{i-1}$, where k varies between 1 and $2^{m-i}$. In other words, the auxiliary cells are those which are found at the odd ranks of the first column, at the couples of odd ranks of the second column, at the quadruplets of odd ranks of the third column, ..., at the $2^{i-1}$-uplets of odd ranks of column i. As with the normal cells, k designates the number in column i of the $2^{i-1}$-uplet of auxiliary cells containing the cell of row j.

According to the present invention, all the consecutive auxiliary cells 21 in a column are connected in parallel by their inputs and their outputs. The auxiliary cells of the first column, each associated to a different value of k, each receive on their first input couple $\{E1, E2\}$ a couple $\{P_j, G_j\}$ coming from block 1 and on their second input couple $\{E3, E4\}$ a couple $\{P_{j+1}, G_{j+1}\}$ coming from block 1.

The auxiliary cells of the other columns (i different from 1) each receive on their first input couple $\{E1, E2\}$ the output couple $\{O1, O2\}$ coming from the cell of column i-1 and of row $(k-1)2^i+1$ and on their second input couple $\{E3, E4\}$ the output couple $\{O1, O2\}$ coming from the cell of column i-1 and of row $k2^i-2^{i-1}+1$. For example, in FIG. 2, the cells of column 3 and of rows 1, 2, 3, and 4 of block 2 each receive on their first input couple $\{E1, E2\}$ the output couple $\{O1, O2\}$ generated by the cell of column 2 and row 1 and on their second input couple $\{E3, E4\}$ the output couple $\{O1, O2\}$ generated by the cell of column 2 and of row 5.

It should be noted that the cell of column 2 and of row 1 and the cell of column 2 and of row 2 receive the same inputs and generate together the same output couple $\{O1, O2\}$ and thus exhibit a double fan-out. By observing the connections of the elementary cells of block 2, it should also be noted that the output couple $\{O1, O2\}$ generated in parallel by the cells of column 2 and of rows 1 and 2 is a copy, generated with a double fan-out, of the output couple $\{O1, O2\}$ generated by the cell of column 2 and of row 4.

The output couple $\{O1, O2\}$ generated in parallel by the cells of column 2 and row 1 and 2 is provided to the first input couple $\{E1, E2\}$ of the normal cells of third column instead of, in a conventional structure, the output couple $\{O1,O2\}$ generated by the cell of column 2 and of row 4.

In other words, the present invention comprises, in block 2, generating by means of the auxiliary cells copies of the output couples $\{O1, O2\}$ which, in prior art, were each used to control several elementary cells.

It should also be noted that the higher the number of columns of the particular adder being used, the more auxiliary cells are available to create the copies of the output couples.

With the example of a 32-bit adder, the critical path crosses 8 parallel cells 21 controlling 32 cells, 4 parallel cells 21 controlling 16 cells, 2 parallel cells 21 controlling 8 cells, one cell 21 controlling 4 cells and one cell 11 controlling 2 cells. Thus, the maximum required fan-out is 4, against 16 conventionally. The crossing time of each stage through the critical path is thus reduced to the crossing time of a cell 21 of fan-out 4, and the speed of the adder according to the present invention is significantly increased with respect to prior art.

Further, it should be noted that all cells 21 used according to the present invention have a fan-out of 4. In other words, they are of the same size, which facilitates their arrangement in an array. An adder, the size of which does not exceed the size of an adder according to prior art, organized in an array of m columns and n rows, can be made, since the cells added according to the present invention only occupy the locations which are generally left empty in the conventional architecture.

The single size of the cells 21 used according to the present invention avoids having to create and manage a specific sub-library containing all the cells 21 of different size, and enables to reduce or eliminate the problems linked to the fan-out/propagation time compromise in the design of an adder.

On the other hand, since the normal cells only control a single cell, their fan-out can be divided by 4 with respect to the fan-out of an auxiliary cell. Such a fan-out decrease results in a decrease in the size and the fan-in, that is, the propagation time, of the cell. Since half of the cells 21 controlled by a group of auxiliary cells connected in parallel are normal cells, a decrease in the fan-in of the normal cells allows a decrease in the fan-out of the auxiliary cells, and to increase their operating speed. It is thus possible, by using a different size for the normal cells 21 and for the auxiliary cells 21, to further increase the operating speed of the adder according to the present invention.

A remarkable aspect of the present invention is that it is particularly well adapted to an architecture of an adder that performs operations over a variable number of bits.

Figure 3:
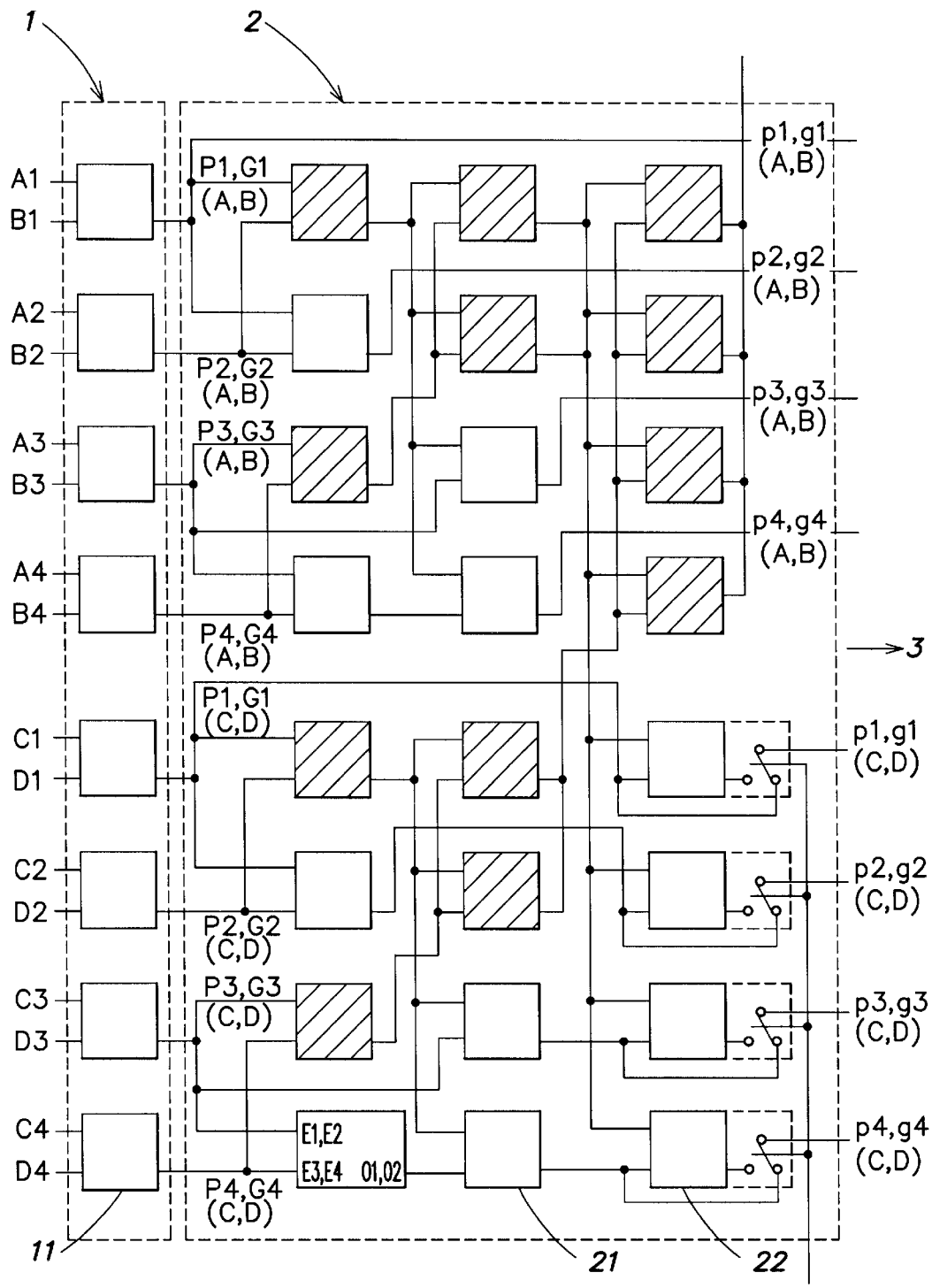
FIG. 3 shows an alternative of the adder of FIG. 2.

FIG. 3 schematically shows the architecture of an adder of variable size according to the present invention. The adder shown in FIG. 3 enables, according to a control bit COM, to add two operands A and B of eight bits or four operands A, B, and C, D of four bits. The same references designate the same elements in FIG. 3 and in FIG. 2.

The cells of column 3 and of rows 5 to 8 of block 2 of the adder are cells 22 of a specific type, receiving a control bit COM. A cell 22 receives two input couples {E1, E2} and {E3, E4}, like a cell 21, but its output {O1, O2} receives, according to control bit COM, either signals such that O1=E1•E3 and O2=E2•E4+O3, or signals such that O1=E3 and O2=E4. In other words, a cell 22 has the same functions as a cell 21 and can further become transparent with respect to its second input couple, {E3, E4}, in response to control signal COM.

When signal COM is inactive, cells 22 behave in the same way as cells 21, and the adder shown in FIG. 3 allows addition of two operands of eight bits, and when signal COM is active, cells 22 are transparent with respect to their second input couple, {E3, E4}, and the adder shown in FIG. 3 enables, as has been shown, to add two couples A, B and C, D of four bits. It will easily be noted that it is possible, by replacing the cells 21 of the second column of the adder of FIG. 3 with the cells 22 controlled by a second control signal, to pass from an adder of twice four bits to an adder of four times two bits. Similarly, the present invention will easily be adapted to sixteen-bit, thirty-two-bit, or sixty-four-bit adders.

For clarity, the present invention has been described in relation with an eight-bit adder, but it will be appreciated that the present invention becomes more useful and advantageous as the number of bits of the adder increases.

Similarly, the present invention is likely to have various alterations, modifications, and improvements which will readily occur to those skilled in the art. As an example, the present invention uses an equal number of normal cells and of auxiliary cells in block 2 of the adder, but the number of auxiliary cells could possibly be reduced or increased according to the needs. Similarly, the present invention has been described in relation with adders having a number of bits equal to a power of 2, but those skilled in the art may easily adapt the present invention to adders processing a different number of bits.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A digital adder for adding a first n-bit operand A and a second n-bit operand B, with $n=2^m$, comprising:
   a first block calculating couples of signals Pq and Gq based on the bits of rank q, Aq and Bq, of the first and second operands, with Pq=Aq+Bq and Gq=Aq•Bq;
   a second block formed of an array of normal elementary cells and auxiliary elementary cells of identical functions arranged in n rows and m columns;
   the normal elementary cells disposed in (row j, column i) of the second block where j is a set of integers from $k2^i-2^{i-1}+1$ to $k2^i$, k being the set of integers from 1 to $2^{m-i}$,
   the first input couple to a normal elementary cell is the couple $\{P_{j-1}, G_{j-1}\}$ if the normal elementary cell is located in column 1 of the second block and the output couple coming from the auxiliary elementary cell of column i-1 and of row $(k-1)2^i+1$ of the second block otherwise,
   the second input couple to a normal elementary cell being the couple $\{P_j, G_j\}$ if $j=k2^i-2^{i-1}+1$ or i=1, or the output couple coming from the normal elementary cell of row j and of column r+1, where r is defined such that $2^r+1 \leq j-(k-1)2^i-2^{i-1} \leq 2^{r+1}$, otherwise; and
   the auxiliary elementary cells, disposed in column i, row j of the second block, j is the set of integers between $(k-1)2^i+1$ and $k2^i-2^{i-1}$ inclusive, having inputs and outputs connected in parallel with those of the auxiliary elementary cells and normal elementary cells corresponding to a same value of k and of i, wherein:
   the first input couple of an auxiliary elementary cell is couple $\{P_j, G_j\}$ if the auxiliary elementary cell is in column 1 of the second block and the output couple coming from the auxiliary elementary cell of column i-1 and of row $(k-1)2^i+1$ of the second block otherwise, and
   the second input couple of an auxiliary elementary cell is couple $\{P_{j+1}, G_{j+1}\}$ if the auxiliary elementary cell is in column 1 of the second block and the output couple coming from the auxiliary elementary cell of column i-1 and of row $k2^i-2^{i-1}+1$ of the second block otherwise.

2. The digital adder of claim 1, wherein the normal cells have a smaller size than the auxiliary cells.

3. The digital adder of claim 1, comprising means for, at least in a column of highest rank, selecting, as an output, output couples of normal cells in the column of the highest rank of the second input couples of these cells.

4. A digital adder circuit comprising:
   a plurality of normal cells whose outputs control a number of cells or circuits; and
   an equal number of auxiliary cells as normal cells that provide a same output value as a corresponding normal cell, wherein the digital adder circuit has at least one switch to select an output of at least one of the normal cells or an input to the at least one of the normal cells.

5. The digital adder circuit of claim 4 wherein the auxiliary cells have a same size.

6. The digital adder circuit of claim 4 wherein the outputs of the normal cells control only one cell or circuit.

7. The digital adder circuit of claim 4 wherein the normal cells have a same size.

8. A digital adder circuit comprising:

a plurality of normal cells whose outputs are connected to a same number of cells or circuits; and a plurality of auxiliary cells that provide a same output value as a corresponding normal cell, wherein the digital adder circuit has at least one switch to select an output of at least one of the normal cells or an input to the at least one of the normal cells.

9. The digital adder circuit of claim 8 wherein the auxiliary cells have a same size.

10. The digital adder circuit of claim 8 wherein the outputs of the normal cells control exactly one cell or circuit.

11. The digital adder circuit of claim 8 wherein a number of auxiliary cells is the same as a number of normal cells.

12. The digital adder circuit of claim 8 wherein the normal cells have a same size.

* * * * *

UNITED STATES PATENT AND TRADEMARK OFFICE
CERTIFICATE OF CORRECTION

PATENT NO.    : 6,560,625 B1
DATED         : May 6, 2003
INVENTOR(S)   : Stéphane Rossignol and Pierrette Faucherand It is certified that error appears in the above-identified patent and that said Letters Patent is hereby corrected as shown below:

Column 6,
Lines 58-61, Claim 3 should read as shown below:

-- 3.    (Amended) The digital adder of claim 1, comprising means for, at least in a column of highest rank, selecting, as an output, output couples of normal cells in the column of the highest rank or the second input couples of these cells. --

Signed and Sealed this

Second Day of September, 2003

JAMES E. ROGAN
*Director of the United States Patent and Trademark Office*